UNITED STATES PATENT OFFICE.

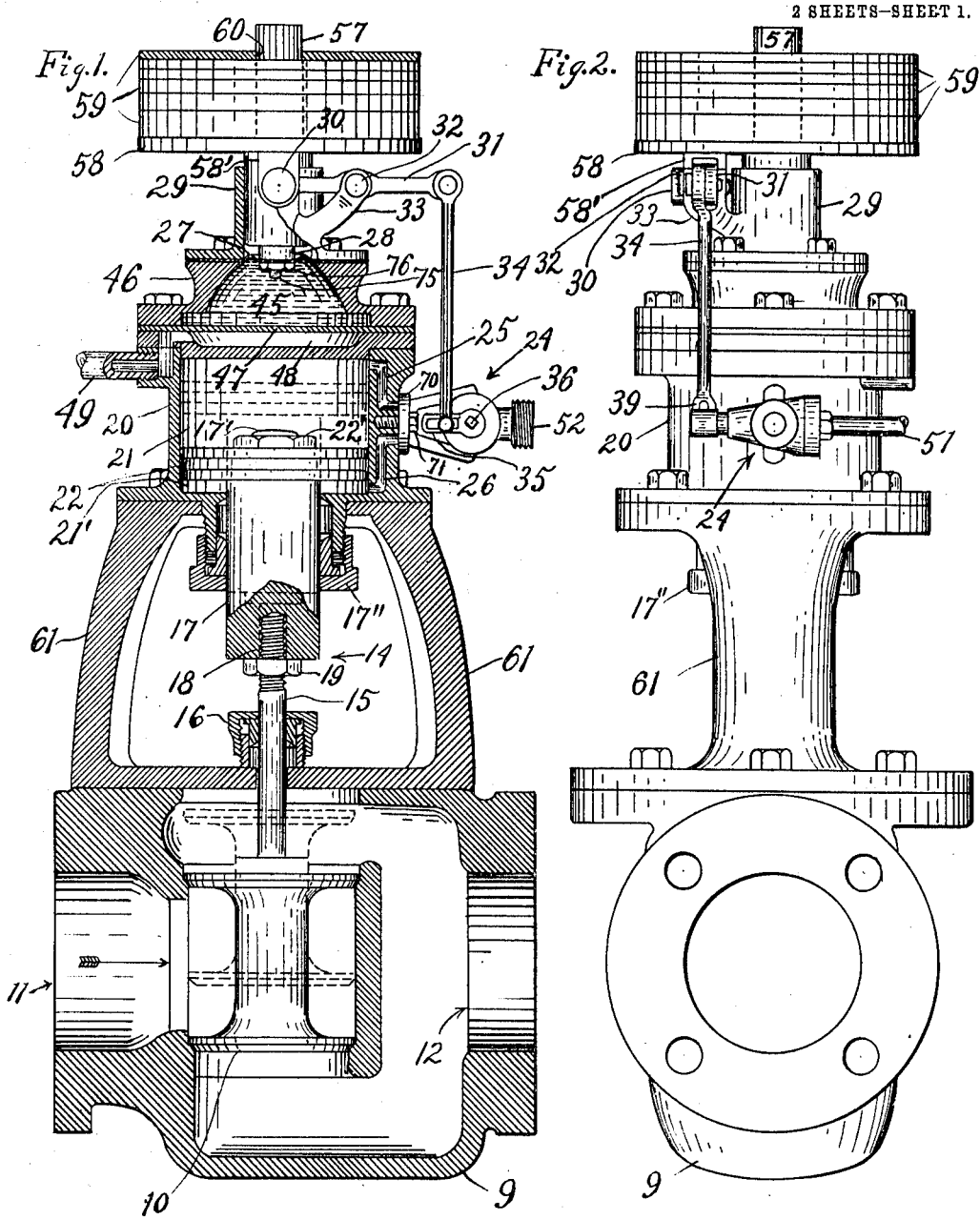

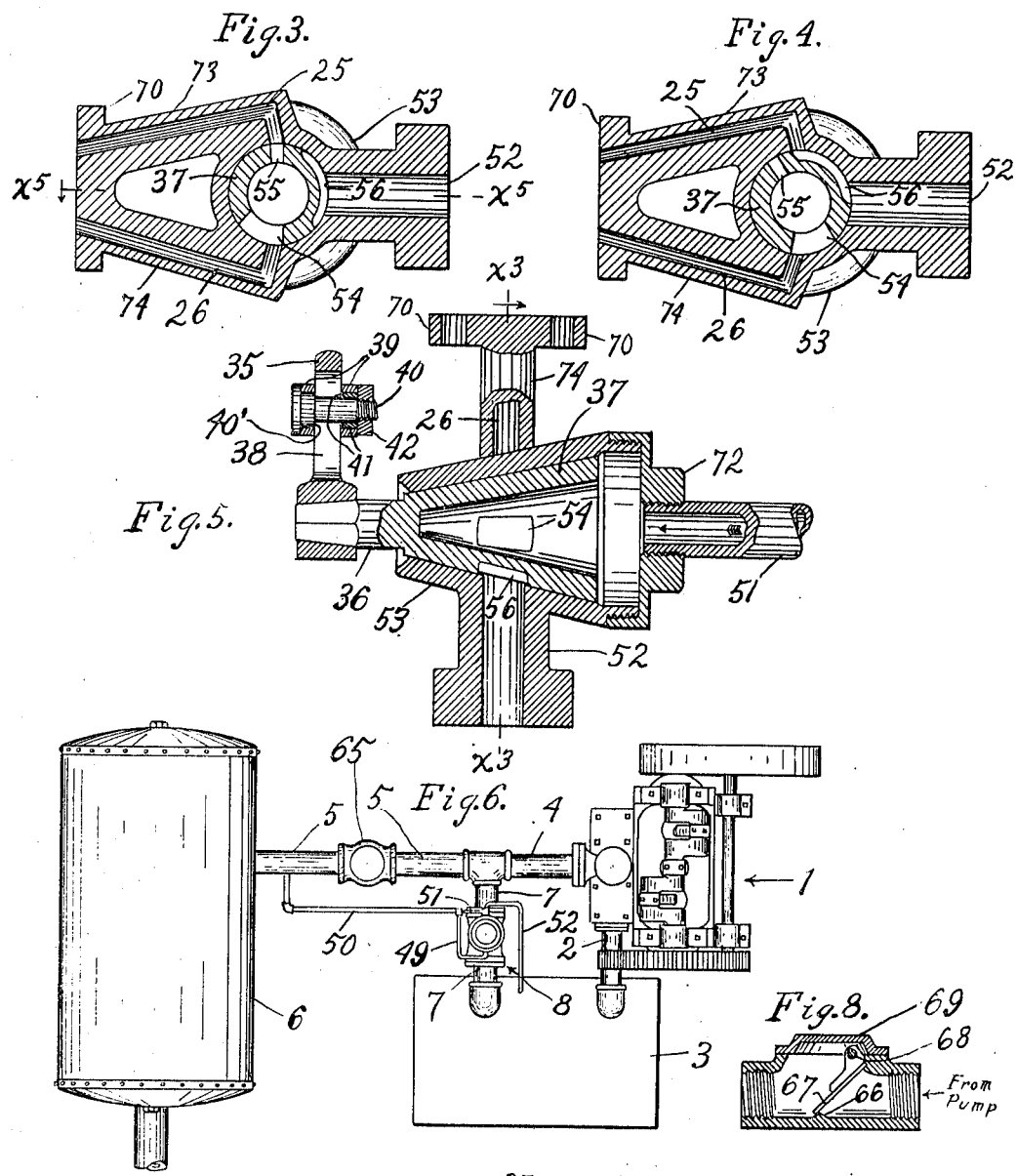

SPENCER G. NEAL AND JOSEPH M. CHILDRESS, OF LOS ANGELES, CALIFORNIA, ASSIGNORS TO CALIFORNIA VALVE AND AIR BRAKE COMPANY, OF PALMS, CALIFORNIA, A CORPORATION OF CALIFORNIA.

PRESSURE-REGULATING APPARATUS.

970,736.     Specification of Letters Patent.     Patented Sept. 20, 1910.

Application filed August 17, 1908, Serial No. 448,935. Renewed March 19, 1910. Serial No. 550,516.

*To all whom it may concern:*

Be it known that we, SPENCER G. NEAL and JOSEPH M. CHILDRESS, both citizens of the United States, and both residents of the city of Los Angeles, State of California, have invented a new and useful Pressure-Regulating Apparatus, of which the following is a specification.

An object of this invention is to provide an apparatus of the character stated of simpler and more durable construction than others of its class.

Another object is to provide valve-operating means that will be operated by a very slight variation of pressure.

Another object is to provide improved weighted means for operating a pilot valve, said means being set to operate at different pressures, the weights acting directly upon such weighted means without the use of any lever which would project laterally from the apparatus and cause it to occupy additional floor space.

The invention, as illustrated in the drawings, relates to a valve arranged to maintain a predetermined amount of pressure in a storage tank or accumulator by means of diverting the flow of water from a pump to a by-pass leading to the supply from which the pump is drawing water, so that the operation of the pump may be continued without producing excessive pressure in the storage tank. It is to be understood, however, that this newly invented pressure regulating apparatus may be applied in relations other than those illustrated in the drawings.

With a view to obtaining the above and other advantages, this invention consists in such features, details of construction, combinations and sub-combinations of parts as will be described in connection with the accompanying drawings and more particularly pointed out in the claims.

Referring to the accompanying drawings which illustrate the invention,—Figure 1 is a vertical mid-section of the invention embodied in a regulating valve operatively connected with a main valve designed to control the flow of water delivered from a pump. Fig. 2 is a side elevation looking from the right toward the left of Fig. 1. Fig. 3 is a longitudinal mid-section of the pilot valve, the plug thereof being shown in the position which it occupies when the other parts are in the positions shown in full lines in Fig. 1, on line $x^3$ of Fig. 5. Fig. 4 is a view similar to Fig. 3, except that the valve plug is shown in the position which it occupies when the other parts of the apparatus are in the positions shown in dotted lines in Fig. 1. Fig. 5 is a horizontal section of the pilot valve, the plug being in the same position as in Fig. 3, on line $x^5$ of Fig. 3. Fig. 6 is a plan view of the apparatus showing the same applied to a pumping mechanism adapted for supplying water under pressure to operate a hydraulic elevator (not shown). Fig. 7 is a plan view of the plug of the pilot valve in the position shown in Figs. 3 and 5. Fig. 8 is a longitudinal mid-section of a check valve to prevent back flow from the pressure tank.

Referring more particularly to the drawings, in Fig. 6, 1, in a general way designates a pump, 2 the main suction pipe of said pump which draws water from the surge tank 3. 4 is the discharge pipe of said pump, and 5 a continuation of said discharge pipe leading to the accumulator tank 6. 7 is a by-pass pipe leading from the main supply pipe 4 to surge tank 3. 8, in a general way, designates the regulating valve located on said by-pass pipe.

The casing 9 of the main valve 10 (see Figs. 1 and 2) is provided with an inlet 11 communicating with the section of the by-pass 7 which leads from the pump discharge pipe 4, and with an outlet 12 communicating with the section of the by-pass nearest the surge tank 3.

14, in a general way, designates a piston operatively connected with the main valve 10 by any suitable means, as by a rod 15 passing through a stuffing box 16. Said piston is provided with a plunger desirably having a threaded socket 18 into which rod 15 screws, 19 being a lock nut to keep the rod 15 from unscrewing.

20 is a casing forming a piston chamber 21, the piston 14 having a head 22 working in said chamber 21. Piston head 22 is mounted on the end of plunger 17 farthest from rod 15, being desirably held on by a nut 22' screwed onto threaded extension 17'. Plunger 17 is desirably about one-half the diameter of piston head 22.

17" is a stuffing box around plunger 17.

24, in a general way, designates the pilot valve, there being a passage 25 leading from said pilot valve to chamber 21 above piston head 22 and a passage 26 leading from said pilot valve to the lower annular portion 21' of the piston chamber around plunger 17.

A regulating diaphragm 27 is provided at the upper portion of the regulating apparatus, as shown in Fig. 1. Said regulating diaphragm is operatively connected with a pilot valve 24 by means of a stem 28 operating in an annular guide 29 and carrying a plate 58 furnished with a depending lug or yoke 58' having pivoted to it at 30 one end of an operating lever 31, said lever being desirably fulcrumed on pivot 32 carried by an arm 33. The outer end of operating lever 31 is pivotally connected with operating rod 34 which extends downwardly to and is connected with radial valve arm 35. Said valve arm is secured to valve stem 36 desirably formed integral with valve plug 37.

Means are provided for regulating the point of attachment of the lower end of rod 34 to valve arm 35 in order that the parts may be so adjusted that the movements of the regulating diaphragm will give the proper amount of rotation to the plug of the pilot valve. For this purpose said valve arm is preferably provided with a slot 38. Rod 34 is furnished with a yoke 39 which passes astride the valve arm and is connected therewith by means of a pin 40 extending through slot 38.

41 is a bushing which coöperates with nut 42 to clamp pin 40 to valve arm 35 without interfering with the pivotal movement at the joint. Annular shoulder 40' beneath the head of the pin forms a bearing for that side of yoke 39. Beneath regulating diaphragm 27 is a regulating chamber 45 formed within casing 46.

47 is an operating diaphragm of greater area than regulating diaphragm 27, said diaphragms 27 and 47 both being in contact with the liquid in chamber 45. Said operating diaphragm engages a larger area of the liquid in said chamber than does regulating diaphragm 27, with the result that each vertical movement of operating diaphragm 47 produces a more pronounced movement of diaphragm 27, such movement of diaphragm 27 being proportional to the difference in the fluid-engaging areas of the two diaphragms. In other words, the primary or operating diaphragm 47, as well as the secondary or regulating diaphragm 27, forms a part of the wall of a pressure-transmission chamber which is permanently filled with water or other mobile but incompressible medium, and the secondary diaphragm 27, although smaller than the other diaphragm, constitutes a movable portion of the wall of said pressure-transmission or regulating chamber 45 and, in operation, has an amplified movement as compared with the movement of said other diaphragm.

48 is an operating chamber on the side of the operating diaphragm 47 opposite to and below regulating chamber 45, fluid pressure being supplied to operating chamber 48 from an accumulator 6 at all times through conduit 49 preferably formed as a branch (see Fig. 6) of the main regulating pipe 50 which leads from section 5 of the discharge pipe. The supply pipe 51 for the pilot valve 24 is also desirably connected with the main regulating supply pipe 50, as shown in Fig. 6. The valve plug 37 is preferably a hollow cone as best shown in Fig. 5, the supply pipe 51 leading to the large open end of said plug.

52 designates the discharge pipe of the pilot valve leading laterally from the valve casing 53. Plug 37 is provided with a main radial port 54 to maintain communication at all times between the interior of the valve plug and duct 26, and the smaller lateral port 55 which establishes and cuts off communication between the interior of the plug and duct 25. Discharge groove 56 is adapted to establish and cut off communication between duct 25 and the discharge 52.

Referring to the weighted means for opposing pressure of the liquid on the regulating diaphragm, stem 28 is provided with an upward extension 57 and a wide annular flange 58, said flange and extension serving to support a series of superposed regulating weights 59 of various sizes each desirably having a central hole 60 so that said weights may be placed over extension 57 and held centrally upon flange 58 by said extension. Piston casing 20 is desirably supported upon main valve casing 9 by a frame 61. Check valve 65 for preventing back flow from accumulator 6 may be of any suitable construction, being shown in Fig. 8 provided with an inclined seat 66 and a flap 67 pivoted at 68 to swing toward and from said seat. 69 is a cap closing the top of said valve.

The balanced valve 10 illustrated in the drawings is of well known construction and is not described in detail, because, considered by itself it forms no part of this invention. It is to be understood that this regulating apparatus is adapted to operate various other valves than the one illustrated in the drawing.

The operation is as follows: When the pressure in the accumulator is below the maximum which the apparatus is set to permit, the main valve remains closed and the piston depressed as shown in full lines in Fig. 1. While the parts are in this position the pump continues to force water into accumulator 6 until the pressure in the accumulator rises and acts in operating chamber 48 with sufficient force to lift diaphragm 47 thereby actuating the liquid in regulating chamber 45 and lifting regulating diaphragm 27 against the opposition of weighted stem 28. This operation will lift the inner and depress the outer end of operating lever 31, thus depressing rod 34 and with it the free end of valve stem 35 moving the valve from the position shown in Fig. 3 to that shown in Fig. 4. This movement of the valve plug will not cut off the communication from the interior thereof through passage 26 to the chamber 21' beneath the piston head, but will cut off communication between the interior of the plug and the passage 25 by way of radial port 55 and will, instead, bring the passage 25 into communication with the discharge 52 by way of discharge 56. Pressure from the accumulator will now be communicated by means of pipe 50 and 51 to interior of valve 37, thence to passage 26 to chamber 21' and will lift piston head 22, because there will be release of pressure in chamber 21 above said piston head thus lessening opposition to the upward movement thereof. The piston in its upward movement will carry with it main valve 10, thus permitting a free passage of water through by-pass 7 and diverting the flow of the pump to surge tank 3, check valve 65 preventing water from escaping from the accumulator 6 to the surge tank. The flow of water through the by-pass will continue until the pressure in the accumulator and in operating chamber 48 has fallen to an amount insufficient to maintain diaphragms 47 and 27 in their elevated position. Weighted stem 28 will then descend thus giving a reverse movement to that just described to the parts connected with said stem and bringing the valve plug back to the position shown in Fig. 3, whereupon pressure will be supplied from the interior of said plug through radial port 55 and passage 25 to chamber 21 above piston head 22. It will be seen that when the plug is in this position, an equal pressure per square inch is maintained both above and below piston head 22, but on account of the entire upper area of said piston head being exposed to pressure, and only the outer portion of the lower side thereof around plunger 17 being exposed to pressure, the pressure on the upper side thereof and will depress the piston bringing the main valve back to its original position.

During the operation last described, water passes from beneath the piston head through the valve plug to chamber 21 above the piston head, the flow of water being augmented in passing through the valve plug to said chamber, because the displacement of water caused by plunger 17 causes less water to flow from beneath the piston than the amount required to fill the space there above.

The casing 53 of the pilot valve is desirably provided with a base flange 70 and bolts 71 extending through holes in said flange at each side of the valve to hold the valve casing against the casing 20 of the piston chamber. Passages 25 and 26 are each formed with an outer and an inner section which register with each other when bolts 71 are screwed down.

72 is a cap closing the large end of the conical valve casing of the pilot valve, said cap leaving a threaded hole into which supply pipe 51 is screwed.

The laterally extending arms 73 and 74 offset base flange 70 from the body portion of the pilot valve so as to provide room for extending radial arm 35 inwardly from the valve plug as shown, thus providing a neat compact arrangement for the pilot valve and its operating means.

Regulating diaphragm 27, which extends across the contracted upper portion of chamber 45, is preferably made from a thin sheet of copper. Diaphragm 47, which underlies the expanded lower portion of said chamber, is desirably made from a tolerably thick sheet of rubber. Stem 28 is desirably provided at its lower end with a threaded extension 75 which projects through a hole in diaphragm 27, stem 28 being securely attached to the diaphragm by means of a nut 76 screwed onto said extension.

We claim:

1. In apparatus of the character described, a main valve, a piston operatively connected with said main valve, a casing forming a piston chamber, said piston having a head working in said chamber, a pilot valve, there being passages leading from said valve to opposite sides of said piston head, a regulating diaphragm, means operatively connecting said regulating diaphragm with said pilot valve, there being a regulating chamber entirely filled with a liquid to operate said regulating diaphragm, an operating diaphragm also in contact with the liquid in said regulating chamber, said operating diaphragm engaging a larger area of the liquid in said regulating chamber than the area engaged by said regulating diaphragm, there being an operating chamber on the side of said operating diaphragm opposite said regulating chamber and a conduit to admit fluid pressure to said operating chamber.

2. In apparatus of the character described, a pilot valve, two diaphragms of differential areas, means operatively connecting the smaller of said diaphragms with said pilot valve, a casing entirely filled with an incompressible liquid in contact with both of said diaphragms, there being a chamber on the side of the larger diaphragm farthest from said smaller diaphragm, and a conduit for supplying fluid to said last named chamber.

3. In apparatus of the character described, a casing provided with a piston chamber, a piston having a head working in said piston chamber, a main valve operatively connected with said piston head, a plunger carried by said piston, said plunger extending through one end of said piston chamber, a pilot valve, there being a passage leading from said pilot valve to each end of said piston chamber, the passage leading to the end adjacent said plunger being continually open to the supply, and means actuated by fluid pressure for operating said pilot valve to open and close the other passage to move said piston.

4. In apparatus of the character described, a casing provided with a piston chamber, a piston having a head working in said piston chamber, a main valve operatively connected with said piston, a plunger carried by said piston, said plunger extending through one end of said piston chamber, a pilot valve, there being a passage leading from said pilot valve to each end of said chamber, the passage leading to the end adjacent said plunger being continually open to the supply, and means actuated by fluid pressure for operating said pilot valve to open and close the other passage to move said piston, said pilot valve being furnished with a hollow-plug having a radial port intermittently in communication with the end of the piston chamber opposite to said plunger, and another radial port of sufficient width to remain continually in communication with the passage leading to end of said piston chamber through which said plunger extends.

5. In apparatus of the character described, a casing containing a piston chamber, a piston having a head working in said chamber, a plunger carried by said piston, said plunger projecting from one side of said head through said chamber, a main valve operatively connected with said piston, and a pilot valve adapted to supply pressure from the supply continually around said plunger beneath said piston head and intermittently to the other side of said piston head.

6. In apparatus of the character described, casing containing a weighted diaphragm, a chamber underlying said diaphragm and an upright piston chamber; a piston having a head working in said piston chamber and a plunger projecting from said piston head through the lower end of said piston chamber; means for supplying fluid pressure to the chamber underlying said diaphragm; a pilot valve; means operatively connecting said pilot valve with said diaphragm, pressure supply means for said pilot valve, said pilot valve being adapted to intermittently supply fluid under pressure from said pressure supply means to the upper surface of said piston head and to intermittently relieve pressure thereabove, and to supply pressure from the supply continually to the lower side of said piston head.

7. In apparatus of the character described, a pilot valve; and operating means for said pilot valve, said operating means comprising a casing containing a regulating chamber entirely filled with an incompressible liquid, a regulating diaphragm at the top of said chamber operated by liquid pressure therein, a stem extending upwardly from said diaphragm, weights mounted on said stem vertically above said diaphragm to oppose upward movements thereof, and means operatively connecting said stem with said diaphragm.

8. In apparatus of the character described, an operating chamber, a regulating chamber thereabove having a contracted top portion and being filled with a liquid, an operating diaphragm separating said chambers, a regulating diaphragm having a smaller working area than said operating diaphragm and forming a closure for the top portion of said regulating chamber, means for admitting fluid pressure to said operating chamber, a pilot valve, means operatively connecting said pilot valve with said regulating diaphragm, a main valve, and means operatively connecting said main valve with said pilot valve.

9. In apparatus of the character described, a pilot valve; and operating means therefor, said operating means comprising a liquid filled chamber having an expanded and a contracted portion, an operating diaphragm extending over the expanded portion of said chamber, a regulating diaphragm extending over the contracted portion thereof, means operatively connecting said regulating diaphragm and said pilot valve, and means for supplying fluid pressure to said operating diaphragm.

10. Pressure regulating apparatus provided with a liquid filled regulating chamber, two diaphragms having differential working areas forming portions of the walls of said chamber, means for supplying fluid pressure to the larger of said diaphragms on the side thereof opposite said chamber, and regulating means operatively connected with said regulating diaphragm.

11. In apparatus of the character described, a main valve, a piston chamber thereabove, a piston operatively connected with said main valve and having a head working in said chamber, an operating chamber above said piston chamber, means for supplying fluid pressure to said operating chamber, an operating diaphragm extending across the top of said operating chamber, a regulating chamber extending upwardly from said operating diaphragm, a regulating diaphragm forming a portion of the top wall of said regulating chamber and having a smaller working area than said operating diaphragm, supporting means above said regulating diaphragm, weights vertically above said regulating diaphragm carried by said supporting means to oppose upward movement of said regulating diaphragm, a pilot valve, and means operatively connecting said pilot valve with said supporting means, said pilot valve being constructed and arranged to control delivery of fluid to and from said piston chamber.

12. In apparatus of the character described, a pilot valve; and operating means therefor, said operating means comprising a liquid filled chamber having an expanded and a contracted portion, an operating diaphragm extending over the expanded portion of said chamber, a movable portion of the wall of said chamber extending over the contracted portion thereof, means operatively connecting said portion of wall to said pilot valve, said portion of wall having, in operation, an amplified movement as compared with said operating diaphragm, and means for supplying fluid pressure to said operating diaphragm.

In testimony whereof we have hereunto signed our names in the presence of two subscribing witnesses at Los Angeles, California, this 10th day of August, 1908.

SPENCER G. NEAL.
JOSEPH M. CHILDRESS.

Witnesses:
W. H. SHEASBY,
ALBERT H. MERRILL.